United States Patent
Shah et al.

(10) Patent No.: US 9,329,879 B2
(45) Date of Patent: May 3, 2016

(54) DEVICE, METHOD, AND SYSTEM TO ENABLE SECURE DISTRIBUTION OF JAVASCRIPTS

(75) Inventors: Sagar K. Shah, San Diego, CA (US); Subrato K. De, San Diego, CA (US); Mark Bapst, South Barrington, IL (US); Dineel D. Sule, San Diego, CA (US); George Michael Milikich, Round Rock, TX (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 1028 days.

(21) Appl. No.: 13/403,071

(22) Filed: Feb. 23, 2012

(65) Prior Publication Data

US 2013/0227354 A1 Aug. 29, 2013

(51) Int. Cl.
| | |
|---|---|
| *G06F 9/45* | (2006.01) |
| *G06F 11/07* | (2006.01) |
| *G06F 9/455* | (2006.01) |
| *G06F 11/36* | (2006.01) |
| G06F 21/12 | (2013.01) |
| G06F 21/60 | (2013.01) |

(52) U.S. Cl.
CPC .......... *G06F 9/45516* (2013.01); *G06F 11/362* (2013.01); *G06F 21/128* (2013.01); *G06F 21/602* (2013.01)

(58) Field of Classification Search
CPC .. G06F 9/45516; G06F 21/128; G06F 11/362
USPC ................................ 717/140, 141, 148, 151
See application file for complete search history.

(56) References Cited

U.S. PATENT DOCUMENTS

| | | | | |
|---|---|---|---|---|
| 7,100,195 | B1 * | 8/2006 | Underwood | G06F 9/4443 707/999.009 |
| 8,843,997 | B1 * | 9/2014 | Hare | H04L 63/0281 709/200 |
| 8,850,574 | B1 * | 9/2014 | Ansel et al. | 726/22 |
| 9,075,990 | B1 * | 7/2015 | Yang | G06F 21/55 |
| 2002/0129137 | A1 * | 9/2002 | Mills, III | G06F 11/3495 709/224 |
| 2007/0055964 | A1 * | 3/2007 | Mirkazemi | G06F 8/41 717/140 |
| 2008/0163168 | A1 * | 7/2008 | Huang | G06F 8/423 717/118 |

(Continued)

OTHER PUBLICATIONS

"Preventing Capability Leaks in Secure JavaScript Subsets";"Finifter et al";"2010";"4 pages".*

(Continued)

*Primary Examiner* — Anna Deng
*Assistant Examiner* — Brahim Bourzik
(74) *Attorney, Agent, or Firm* — Neugeboren O'Dowd PC

(57) ABSTRACT

A computing device adapted to receive at least one JavaScript, the computing device comprising a processor type and one or more architectural features. The at least one JavaScript comprises one or more first sections of the JavaScript and one or more second sections of the JavaScript. The one or more first sections of the JavaScript may be pre-compiled using the processor type or the one or more architectural features. The one or more second sections of the JavaScript may be sent to a JavaScript Compiler in source format. A JavaScript Engine may be adapted to execute the one or more first sections of the JavaScript and the subsequently compiled one or more second sections of the JavaScript, keeping elements of the scripting code proprietary, with the pre-compilation of the one or more first sections of the JavaScript eliminating run-time compilation and therefore providing performance benefits.

14 Claims, 5 Drawing Sheets

(56) References Cited

U.S. PATENT DOCUMENTS

| | | | | |
|---|---|---|---|---|
| 2010/0153929 | A1* | 6/2010 | Porras et al. | 717/139 |
| 2011/0099629 | A1* | 4/2011 | Boesgaard | 726/22 |
| 2011/0138192 | A1* | 6/2011 | Kocher | G06F 21/602 713/189 |
| 2012/0005578 | A1* | 1/2012 | Hawkins | 715/702 |
| 2012/0143866 | A1* | 6/2012 | Mameri et al. | 707/737 |
| 2014/0173692 | A1* | 6/2014 | Srinivasan | H04W 12/02 726/4 |
| 2014/0283067 | A1* | 9/2014 | Call | H04L 63/1425 726/23 |
| 2014/0337614 | A1* | 11/2014 | Kelson | H04L 63/0428 713/152 |

OTHER PUBLICATIONS

"ConScript: Specifying and Enforcing Fine-Grained Security Policies for JavaScript in the Browser";"Meyerovich et al";"2010";"16 pages".*

"Lightweight Self-Protecting JavaScript";"Phung et al";"Marsh 2009";"14 pages".*

"Characterizing Insecure JavaScript Practices on the Web";"Yue et al"; "Apr. 20 2009" "10Pages".*

Abadi, M., et al., "Control-Flow Integrity", CCS'05, Nov. 7-11, 2005, Alexandria, Virginia, 2005, p. 14, Publisher: Ass'n. for Computing Machinery, Published in: US.

Ansel, J., et al., "Language-Independant Sandboxing of Just-In-Time Compilation and Self-Modifying Code", PLDI'11, Jun. 4-8, 2011, San Jose, California, 2011, p. 12, Publisher: Ass'n. for Computing Machinery, Published in: US.

Google Developers, "Closure Tools", Webpage found at https://developers.google.com/closure/, May 30, 2012, Publisher: Google, Published in: US.

Nativeclient, "Native Code for Web Apps", Webpage found at http://code.google.com/p/nativeclient/, May 30, 2012, Publisher: Google Project Hosting, Published in: US.

Donovan, A, et al., "PNaCl: Portable Native Client Executables", Webpage found at http://nativeclient.googlecode.com/svn/data/site/pnacl.pdf downloaded May 30, 2012, Feb. 22, 2010, p. 6, Published in: US.

Pronschinske, M., "Emscripten: An LLVM-to-JavaScript Compiler", Webpage found at http://css.dzone.com/emscripten-llvm-javascript, May 30, 2012, Publisher: DZone, Inc., Published in: US.

"Free Javascript Obfuscator: Protects JavaScript code from stealing and shrinks size", Webpage found at http://javascriptobfuscator.com/, May 30, 2012, Publisher: CuteSoft Components Inc., Published in: US.

"Javascript Obfuscator: Best JavaScript compression on the web", Webpage found at http://javascript-source.com/, May 30, 2012, Publisher: Javascript-Source.com, Published in: US.

"JavaScript Obfuscators Review", Webpage found at http://javascript-reference.info/javascript-obfuscators-review.htm, May 30, 2012, Published in: US.

"The Chromium Projects: Native Client", Webpage found at http://www.chromium.org/nativeclient, May 30, 2012, Published in: US.

Sehr, D., et al., "Adapting Software Fault Isolation to Contemporary CPU Architectures", Whitepaper found at http://static.googleusercontent.com/external_content/untrusted_dlcp/research.google.com/en/us/pubs/archive/35649.pdf downloaded, May 30, 2012, p. 11.

Yee, B., et al., "Native Client: A Sandbox for Portable, Untrusted x86 Native Code", 2009 IEEE Symp. on Security and Privacy, 2009, p. 15, Publisher: IEEE.

Zakai, Alon, "Emscripten: Using Non-JS Libraries in JS", Powerpoint Presentation found at syntensity.com/static/jsconf_eu_Emscripten_lo.pdf downloaded, May 30, 2012, p. 26 Publisher: Mozilla.

* cited by examiner

DEVICE, METHOD, AND SYSTEM TO ENABLE SECURE DISTRIBUTION OF JAVASCRIPTS

BACKGROUND OF THE INVENTION

1. Field of the Invention

This invention is related to the security of web applications run on a computing device. Specifically, but not intended to limit the invention, embodiments of the invention are related to enabling the secure distribution of JavaScripts to computing devices and protecting JavaScript source code from unwanted distribution and/or modification.

2. Relevant Background

JavaScripts stored on remote network devices are used extensively in many websites and web applications. The source code of JavaScript files downloaded to a local, client device for use in such websites and web applications is often cached on the local device. This source code may be viewed as a separate file on the local device, or the user may view the JavaScript source code by viewing a website or web application HTML code, which may comprise embedded JavaScript code.

JavaScript source code provides portability across platforms, and allows the JavaScript program to be taken, modified, and/or used at will in other web pages and/or web applications. Therefore, the JavaScript developer's invention embodied in the code is not protected. Through the free distribution of unprotected JavaScripts, the ability for website and application owners to differentiate their goods and services from their competitors is diminished. The value of the unique services which are incorporated into JavaScripts becomes limited and short-lived. Furthermore, enabling JavaScript source code in a web browser or other web application may also enable the JavaScript to expose security holes in the browser and applications. An example of this is a JavaScript program which uses WebGL to implement 3D features, which exploits off-screen memory access or creates denial of service (DoS) problems with the device.

In order to try and overcome the ability to view native JavaScript code on a client device, developers sometimes implement byte-code generation to an intermediate format or obfuscation. However, both solutions fall short of providing sufficient protection of the code for the developer. Such existing solutions depend on developers using native (e.g., C/C++) sandbox implementations along with some plugin package managers (e.g., pNACL/NACL in Chrome browsers with Pepper Plugins—brings in yet another language C/C++ together with JavaScript). NACL and pNACL fail to address JavaScript source code copying, only considering C/C++ source code and the native code generated from them. Also the intention of pNACL/NACL has not been source code protection, but rather providing higher performance by using native C/C++ code for time critical parts of the web application.

In current solutions using obfuscation, one may still recover back JavaScript source that may have (i) new "non-understandable" names; (ii) renamed functions and variables; (iii) compressed JavaScript files using a unique compression algorithm; (iv) removed comments and white spaces; (v) added finishing semi-colon (i.e., ";") where ever appropriate; and (vi) a new list of function and variable names. For example, function ADD(a, b){var c; c=a+b;} may be converted to var_0x9f27=[ ];function ADD(_0x64f2x2,_0x64f2x3) {var_0x64f2x4;_0x64f2x4=_0x64f2x2+_0x64f2x3;}. Such byte-code based intermediate forms (e.g., LLVM bitcode) can be converted back to JavaScript source code, as demonstrated by Mozilla in "Emscripten: An LLVM-to-JavaScript Compiler". Since current byte-level intermediate-code formats can be converted back to JavaScript, machine-independent intermediate code formats are not optimal for protecting JavaScript source code.

SUMMARY OF THE INVENTION

Embodiments of the current invention contemplate that, lower the form and closer to machine code the JavaScript is represented, closer to binary/more obscure the code and therefore, more difficult it is to convert the code back to meaningful JavaScript source code. In one embodiment an application is adapted to receive the at least one JavaScript from a network device. The received at least one JavaScript comprises one or more compiled first sections, with the processor type and the one or more computing device features being used in compiling the one or more first sections. The at least one JavaScript also comprises one or more second sections. The computing device further comprises a JavaScript Compiler adapted to compile the one or more second sections of the at least one JavaScript and a JavaScript Engine and adapted to execute the one or more first sections of the at least one JavaScript and the one or more second sections of the at least one JavaScript.

Another embodiment of the invention comprises a computing system. One computing system comprises means for developing source code of one or more JavaScripts. The computing system further comprises means for implementing decision logic to determine a partitioning of the one or more JavaScript source code into (i) a first portion of code comprising code chosen to be converted/compiled to a device-specific code due to at least one of, protecting one or more unique code features, and an ease of conversion, and (ii) a second portion of code comprising code not chosen to be converted/compiled to device-specific code. The computing system yet further comprises means for pre-compiling the first portion of the code as the device-specific code, means for identifying the first portion of code as the device-specific code, and means for placing the identified device-specific code and the second portion of code into a web application file.

Another embodiment of the invention comprises a computing device. One computing device comprises an application adapted to receive at least one JavaScript, the request comprising a computing device processor type and one or more computing device architectural features. In one embodiment, the at least one received JavaScript comprises one or more pre-compiled first sections with the processor type and the one or more computing device architectural features being used in pre-compiling the one or more first sections of the at least one JavaScript. The at least one JavaScript also comprises one or more second sections of the at least one JavaScript. The computing device further comprises a JavaScript Compiler adapted to compile the one or more second sections of the at least one JavaScript and a JavaScript Engine adapted to execute the one or more first sections of the at least one JavaScript and the one or more second sections of the at least one JavaScript.

Yet another embodiment of the invention comprises a method of processing a JavaScript. One method comprises sending a request for the JavaScript from a computing device to a hosting device, the request comprising a computing device processor type and one or more computing device architectural features. The method further comprises using the processor type, the one or more computing device architectural features, and the requested JavaScript at the hosting device to partition the JavaScript into one or more first sections of the JavaScript and pre-one or more second sections of the JavaScript, and compile one or more first sections of the JavaScript. The method may further comprise attaching header information to the one or more first sections of the JavaScript, the header information identifying the one or more first sections of the JavaScript as JavaScript compiled using the processor type and the one or more computing device architectural features. Additionally, the method comprises sending the JavaScript to the computing device from the hosting device, the JavaScript comprising, the one or more first sections of the JavaScript and one or more second sections of the JavaScript, the one or more second sections of the JavaScript comprising any remaining sections of the JavaScript not partitioned and pre-compiled as the one or more first sections of the JavaScript. The method then comprises sending the pre-compiled one or more first sections of the JavaScript to the computing device with header information identifying the pre-compiled one or more first sections of the JavaScript as JavaScript compiled using the processor type and the one or more computing device architectural features, compiling the one or more second sections of the JavaScript and executing the pre-compiled one or more first sections of the JavaScript and one or more second sections of the JavaScript at the computing device.

And yet another embodiment of the invention comprises a non-transitory, tangible computer readable storage medium, encoded with processor readable instructions to perform a method of processing one or more JavaScripts. One method of processing JavaScripts comprises separating pre-compiled device-specific JavaScript code from JavaScript source code in the one or more JavaScripts, compiling the JavaScript source code, verifying the pre-compiled device-specific JavaScript code is (i) in a proper format, and (ii) meets one or more security levels, and merging compiled JavaScript source code and pre-compiled device-specific JavaScript code to obtain an optimized JIT code. The method may further comprise processing the optimized JIT code.

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

BRIEF DESCRIPTION ON THE DRAWINGS

DETAILED DESCRIPTION

Figure 1:
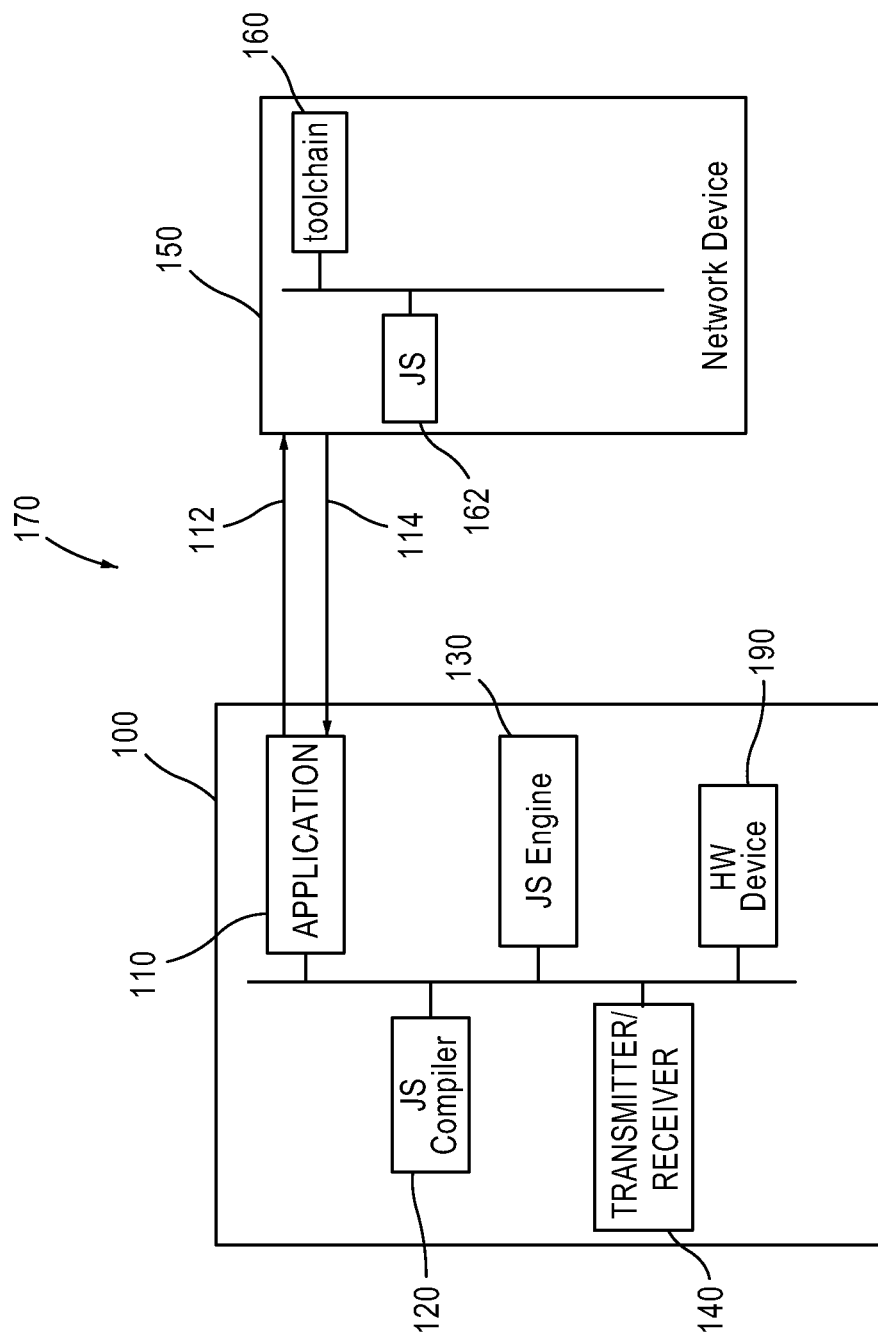
FIG. 1 illustrates a block diagram depicting components of a computing device.

Looking first at FIG. 1, seen is a computing device 100 comprising an application 110, a JavaScript Compiler 120, and a JavaScript Engine 130. In one embodiment, the application 110 may comprise a web browser. However, the application 110 may also comprise other applications, WebOS or Web App framework adapted to access web content or other, locally-stored or non-network based JavaScripts. Though displayed as separate features in FIG. 1, the JavaScript Compiler 120 and JavaScript Engine 130 may comprise a single feature. Additionally, the JavaScript Compiler 120 and/or the JavaScript Engine 130 may comprise a Java Virtual Machine.

Through the use of a transmitter/receiver 140, such as, but not limited to, a wireless communication device, the application 110 may send a request 112 to receive at least one JavaScript. One request 112 may comprise a plurality of requests to receive at least one JavaScript. For example, the request 112 may comprise an initial HTTP_GET request sent from the application 110 comprising a web browser requesting to receive and view a web page. The request 112 may further comprise a user-agent string. For example, when processing to send the request 112 is initiated, a determination may be made whether the device 100 is adapted to execute a modified JavaScript such as, but not limited to, a JavaScript comprising precompiled portions. When a computing device is adapted to execute a modified JavaScript, the application 110 may include in the request 112 data comprising a type of processor (cpu) in the computing device 100. The request 112 may also comprise data related to one or more computing device 100 features. For example, architectural features such as, but not limited to, data related to supported formats or graphics hardware may be included in the request. In response to the request 112, the application 110 may receive a response 114 from a network device 150 comprising the at least one JavaScript. One response 114 may comprise a plurality of responses. It is contemplated that the term network device 150 may also be referred to as host, host device, or any other similar term throughout the specification, where appropriate. It is also contemplated that the request 112 may comprise a portion of a JavaScript pushed to the computing device 100 such as, but no limited to, implementing SPDY's Server Push approach. Furthermore, it is also contemplated the response 114 is received from a computing device 100 local cache instead of a network device 150—in such an application, all functions described herein which may occur on the network device 150 may instead occur on the computing device 100.

The at least one JavaScript received from the network device 150 in the response 114 may comprise one or more pre-compiled JavaScript first sections. For example, upon receiving request 112, the network device 150 may review the JavaScript and determine whether it is adapted for modification. If the JavaScript has been developed for modification, and the request 112 states the computing device 100 is adapted to receive a modified JavaScript, the network device 150 may implement a host toolchain 160 to use the requested JavaScript 162, the processor/cpu type and the one or more computing device features received in the request 112 to partition the JavaScript 162 into one or more first sections and one or more second sections. The one or more first sections may then be compiled into a "native" code in order to protect the source code. However, the. The "native" code may be used for one or more portions of the JavaScript 162 when the computing device 100 has informed the computing device 150 it may process such code and the JavaScript 162 has been drafted to supply such code. The hostside toolchain 160 may use the architectural features and processor type, along with the JavaScript 162 code, to determine which sections of the code to convert to "native" code. Determining which sections of the JavaScript 162 code to precompile to a native code may be based on code optimization, can be based on the presence or absence of certain device specific features used in the source code that the web application developer does not want to expose, and can be based on the fact that one or more portions of the JavaScript code implements intellectual proprietary that the developer has agreed or allowed to release in binary.

For example, the hostside toolchain 160 may determine, based on the processor type, architectural features, and JavaScript 162 content, that one unique feature of the JavaScript 162 may be converted to native code without a decrease in JavaScript 162 performance on the computing device 100. The host side toolchain 160 may determine that a certain portion of the JavaScript source code should be precompiled as it contains unique device API access and the user intends to keep the source code for these device APIs, both for the purpose of intellectual property issues and to avoid unwittingly opening up security holes that could be exploited to get unauthorized access to the client device The hostside toolchain 160 may also determine, such as, but not limited to, through runtime profiling, that a separate unique feature of the JavaScript 162 (as identified by the JavaScript 162) will undergo a significant decrease in performance on the computing device 100 and therefore the separate unique feature may not be converted to native code. In one embodiment, such a decrease in performance may comprise a slower operation of the JavaScript—however, other performance decreases such as startup time, power or memory utilization are also contemplated. When a performance issue is detected, the decision logic will have to choose whether to a) pre-compile the code because it is very sensitive to the developer and needs to be protected, hence allow for performance degradation; b) don't pre-compile the code if security is not a concern but performance is; or c) consider the computing device 100 as incapable of running the necessary pre-compiled code in a performance way, and may abort the JavaScript request 112. In cases when the network device 150 considers the computing device 100 as incapable of running the necessary pre-compiled code in a functionally correct way, the network device 150 may decide to send an alternative implementation as JavaScript source code that the developer may have provided as a fall-back support for those devices that cannot support these security & protection mechanisms through precompiled native code from sensitive JavaScript source code. If an alternative JavaScript source code is not available, the ultimate fall back option may be to report back as unsupported application 162—however, other performance decreases are also contemplated.

Native code in one embodiment comprises JavaScript 162 source that has been compiled into an intermediate device-specific code using the processor type and computing device 100 features to determine a proper native format. For example, the host toolchain 160 may comprise software using decision-logic to determine at least one first portion of the JavaScript 162 for conversion to native code. It is contemplated that one or more portions of the JavaScript 162 source code may be selected for conversion by the host toolchain 160 and JavaScript 162 developer in order to protect one or more unique code features and/or because a portion of the code may be easily converted to native code without creating any problems during execution of the code, decreasing the speed of execution, or causing other decreases in performance in executing the code, or even any possible functional incompatibilities. The portion(s) of the JavaScript 162 to convert may be identified by the JavaScript 162 developer in the JavaScript 162 source code. Upon determining the first portion of source code to convert, the host toolchain 160 may also determine a second portion of source code comprising the remaining JavaScript 162 source code not chosen to be converted to device-specific code. Therefore, in one embodiment, the second portion of JavaScript comprises source code. One example application might be a game, whereby the developer wants to ensure that the game engine is protected (the first portion of source code), whereas the game's user interface (the second portion) is ok to keep in source format, since copyright will be more easily enforced. In one embodiment, the response 114 may comprise overhead to verify that the pre-compiled one or more first sections of the JavaScript in native code and/or the one our more section sections of the JavaScript in source binary is safe to execute. In such an embodiment, the computing device 100 may verify that the precompiled native binary comprising the one or more first sections of the JavaScript, or the one or more section sections of the JavaScript, is safe to execute 162 comprises source code.

The host toolchain 160 may then package the first portion of code and second portion of code in a manner adapted to send the pre-compiled first portion and second portion to the computing device 100 such that the computing device 100 should (i) recognize which portion of the JavaScript 162 comprises the first portion and which portion of the JavaScript 162 comprises the second portion, and (ii) be able to process each of the first portion and second portion accordingly. For example, the network device 150 may package the first portion of the code comprising the unique device-specific JavaScript 162 code as one or more ASCII strings or other binary or byte-level strings, a JavaScript 162 wrapper, and one or more headers indicating the code has to execute as "native" code. It is contemplated that throughout the application, the terms "native code", "device-specific code", "first portion of the code", and all similar and related terms may be used interchangeably, where it is appropriate to do so.

In one embodiment, one or more <script> tags may be implemented by the network device 150 in an HTML page to identify the native code as needing different processing. Additionally, when one or more headers are used with the first portion, the headers may include information such as, but not limited to, information related to one or more security handshakes, chksum validation information, and information adapted to enable the pre-compiled one or more first sections of the JavaScript 162 to fall-back and be executed similar to the one or more second sections of the JavaScript 162 source code if the one or more first sections of the JavaScript 162 encounter an error during execution as the device-specific native code. Alternatively, in cases when the network device 150 determines the computing device 100 is incapable of running the pre-compiled code comprising the one or more first sections of the JavaScript in a functionally correct way, the network device 114 may send an alternative non-sensitive and non-proprietary implementation of the one or more first sections of the JavaScript source code that the developer may have provided as a fall-back support for those devices that cannot support the security and protection mechanisms through pre-compiled native code developed from JavaScript source code. If an alternative JavaScript source code is not feasible for the JavaScript and/or computing device 100, the network device 114 may inform the computing device 100 that the application is unsupported. Additional header information may comprise permission and authentication fields, size fields and at least one of a compression algorithm and compression format field. The native JavaScript 162 code may also be packaged with one or more of: a timestamp comprising when the request 112 was processed/received, one or more lengths of the packaged native JavaScript 162

(i.e., a length of the entire JavaScript 162, a length of just the first portion of the JavaScript 162, etc.), and a buffer for future fields.

The application 110 may receive the packaged JavaScript 162 and may implement a modified EVAL function to separate the second portion(s) of the JavaScript 162 from the first portion of the JavaScript 162. Other functions or operations may perform a similar action. In one embodiment, the EVAL function may be adapted to identify the first portion(s) of the JavaScript 162 (i.e., native binary) as ASCII strings and the second portion of the JavaScript 162 as strings. The EVAL function may further perform a security verification of the received packaged JavaScript 162, or may perform other sanity checks on the JavaScript 162. For example, the EVAL function may verify that the JavaScript 162 is properly encrypted (i.e. the unique code portion is in proper format) or comprises one or more encrypted portions.

It is contemplated that the application 110 may be adapted to process the JavaScript 162 received within an HTML file. For example, the response 114 may comprise a web page comprising an HTML page, a CSS object, one or more images, and the JavaScript 162 comprising the pre-compiled one or more first sections of the at least one JavaScript 162 and the one or more second sections of the at least one JavaScript 162. The application 110 may send the one or more second sections of the JavaScript 162 to the JavaScript compiler 120. Upon receiving the JavaScript 162, the JavaScript compiler 120 may compile the one or more second sections of the at least one JavaScript 162. The JavaScript Engine 130 may receive the one or more second sections of the JavaScript 162 from the JavaScript Compiler 120 and the one or more first sections of the JavaScript 162 from the application 110 and process the pre-compiled one or more first sections of the at least one JavaScript 162 and the compiled one or more second sections of the at least one JavaScript 162. In one embodiment, the JavaScript Engine 130 comprises software fault-isolation techniques such as, but not limited to, sandboxing, adapted to safeguard against security holes in the browser or otherwise. The software fault-isolation techniques may be adapted to be applied to the one or more first sections of the at least one JavaScript 162. Additionally, the JavaScript Engine may comprise a modified JavaScript Engine adapted to work with both the second portion of the JavaScript 162 comprising JavaScript 162 source code and the first portion of the JavaScript 162 comprising native device-specific code.

The combination of the computing device 100 requesting the JavaScript 162 and the network device 150 hosting the JavaScript 162 comprises a computing system 170 in one embodiment. One computing system 170 comprises a means for developing source code for one or more JavaScripts. For example, a developer may draft a JavaScript 162 source code where at least a portion of the JavaScript 162 source code, or the entire JavaScript 162 source code, may be adapted to be processed into a native code. The computing system 170 may also comprise a means for implementing decision logic to determine which portion of the source code of the one or more JavaScript 162 should be partitioned into the first portion of code and which portion should be the second portion of code. In one embodiment, the decision logic may comprise the hostside toolchain 160. The hostside toolchain 160 may determine that one or more portions of the JavaScript 162 which operatively communicate with one or more hardware devices on the computing device 110 may be reliably converted to native code without decreasing performance, without breaking functionality and/or security of the computing system 170. In order to prevent the disclosure of various hardware API's in the JavaScript 162 source code, the first portion of code may comprise at least one intermediate hardware API related to at least one hardware device 190 comprising at least one of a geo-location device, display device, imaging device such as—but not limited to—a camera, audio device, file system, and sensor. Other devices such as, but not limited to, gyroscope device, thermal sensors, odor sensors, touch sensors, pressure sensors, motion sensors, direction sensors, and light sensors are also contemplated.

Upon receiving the JavaScript 162 first portion, the application 110 may operatively convert the at least one intermediate API to an API adapted to be read by the device 100. For example, the JavaScript Compiler 120 which may comprise a just-in-time compiler (JIT) Compiler may convert the intermediate API into the proper format. The application 110 may further enable multi-threaded parallel execution of JavaScripts by, for example, using the POSIX feature in LINUX systems. By implementing native code, how the JavaScript 162 may access the low level API's may be hidden. Additionally, the computing device 100 may only execute the JavaScript 162 upon determining that the JavaScript is secure.

The computing system 170 may further comprise a means for identifying the device-specific code as device-specific code. For example, the <script> tag/header may be used in an HTML page to identify the native code. Alternative headers may also be used such as, but not limited to a buffer for future fields, a timestamp comprising when the request 112 for the one or more JavaScript 162 source code was processed/received, and a length field. It is contemplated that such HTML pages may be processed by web browsers. Additionally, one computing system 170 comprises a means for placing the identified device-specific code and the second portion of code into a web application file—this may comprise placing the JavaScript 162 into an HTML file.

Figure 2:
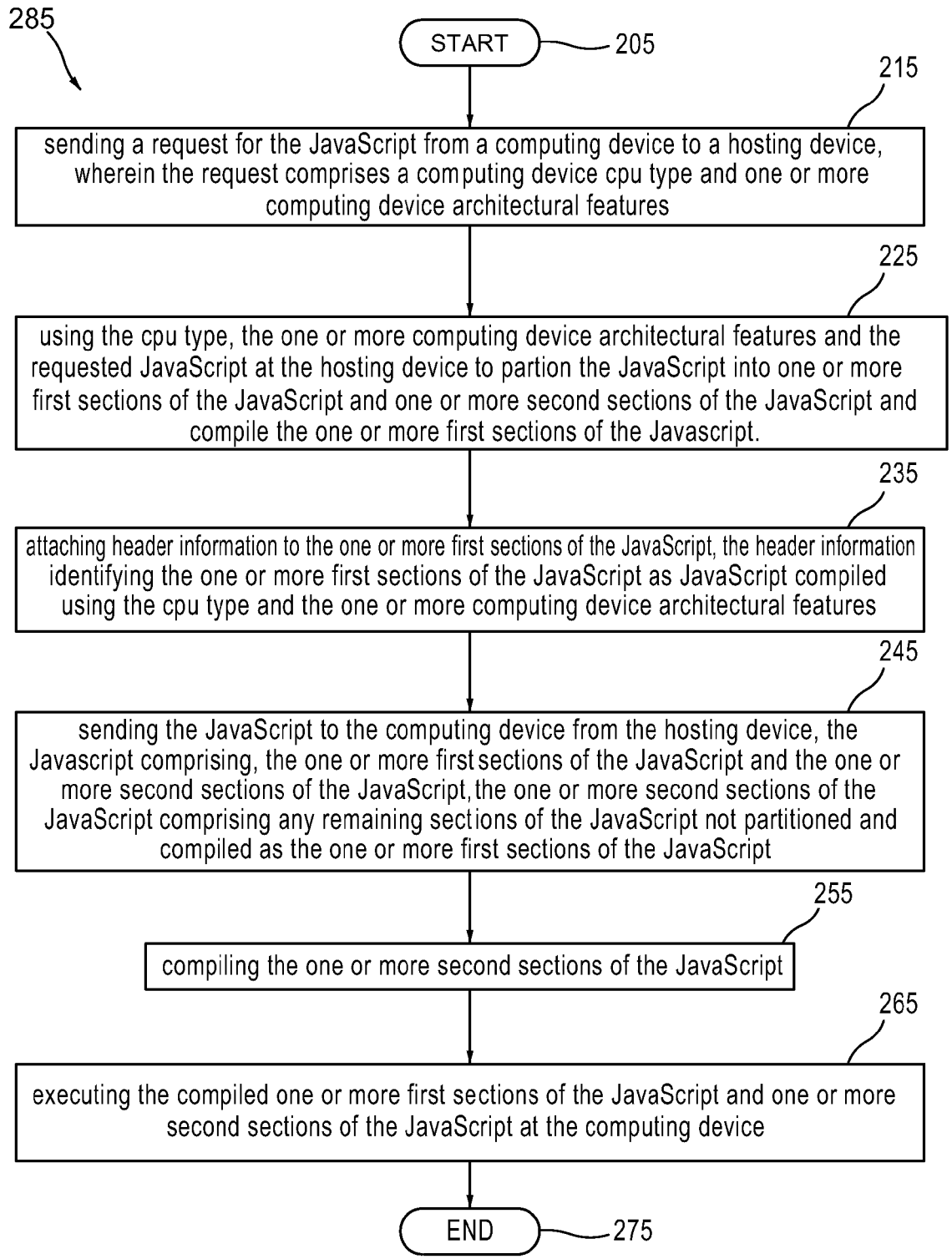
FIG. 2 illustrates a flowchart that depicts a method that may be carried out in connection with the embodiments described herein.

Turning now to FIG. 2, seen is a method 285 of processing a JavaScript 162. One method 285 starts at 205 and at 215 comprises sending a request for the JavaScript 162 from a computing device to a hosting device, wherein the request comprises a computing device processor type and one or more computing device architectural features. For example, the request in FIG. 2 may comprise the request 112 seen in FIG. 1. Similarly, the computing device in FIG. 2 may comprise the computing device 100 of FIG. 1 and the hosting device in FIG. 2 and JavaScript 162 may comprise the network device 150 in FIG. 1. At 225 the method 285 comprises using the processor type, the one or more computing device architectural features, and the requested JavaScript 162 at the hosting device to partition the JavaScript 162 and compile one or more first sections of the JavaScripts. In one method 285, decision logic such as software comprising the toolchain 160 may be operatively used to partition and compile the one or more first sections. Another embodiment could provide for a toolchain mechanism that a web application developer can use to feed in portable JavaScript and get partitioned JavaScript with precompiled code at development & web application deployment time, for a set of possible common client device processor-types. These can then be directly made available in the host that the client device communicates with such that during operation (i.e., once the client contacts) there is much less processing at the host, as described above. At 235, the method comprises attaching header information to the one or more first sections of the JavaScript 162, the header information identifying the one or more first sections of the JavaScript 162 as JavaScript pre-162 compiled using the processor type and the one or more computing device architectural features. At 245 the method 285 comprises sending the JavaScript 162 to the computing device 110 from the hosting device, the JavaScript 162 comprising the one or more first sections of the JavaScript 162. The JavaScript 162 sent to the computing device 110 further comprises one or more second sections of the JavaScript 162. The one or more second sections of the JavaScript 162 may comprise any remaining sections of the JavaScript 162 source code not partitioned and pre-compiled as the one or more first sections of the JavaScript 162. At 255 the method 285 comprises compiling the one or more second sections of the JavaScript 162 and at 265 the method comprises executing the pre-compiled one or more first sections of the JavaScript 162 and one or more second sections of the JavaScript 162 at the computing device. The method 285 ends at 275.

One method 285 maintains portability at the network device 150, as the network device 150 may pre-compile desired sections of the JavaScript to all relevant computing devices 100. However, the compiled and protected JavaScript may not be portable to the computing device 100. In such an embodiment, there is no change for the web application developer since the application is still developed in portable JavaScript code, but the network device 150 is provided with the means to partition the JavaScript.

In one embodiment, using the processor type and one or more computing device architectural features at the hosting device such as, but not limited to the network device 150 to partition and pre-compile one or more first sections of the JavaScript 162 comprises using code that is pre-compiled for at least one of the processor type and the one or more computing device architectural features. For example, the hosting device may have stored thereon a plurality of pre-compiled JavaScripts for specific functions and devices. In reviewing the request 112 for the JavaScript 162, the processor type and the one or more computing device architectural features, the toolchain 160 may determine that at least one of the stored plurality of pre-compiled JavaScripts may be used by the computing device 100, and may therefore insert the at least one pre-compiled JavaScript 162 into the response 114. In one embodiment, there may be for example, pre-compiled JavaScript 162 for at least one of an ARM processor, an IA32 processor, and an x86-64 processor. Such pre-compiled JavaScripts may also comprise pre-partitioned JavaScripts. Programming models such as, but not limited to, OpenCl, that may be operated on GPU and DSP may also fall under the term "processor".

Figure 3:
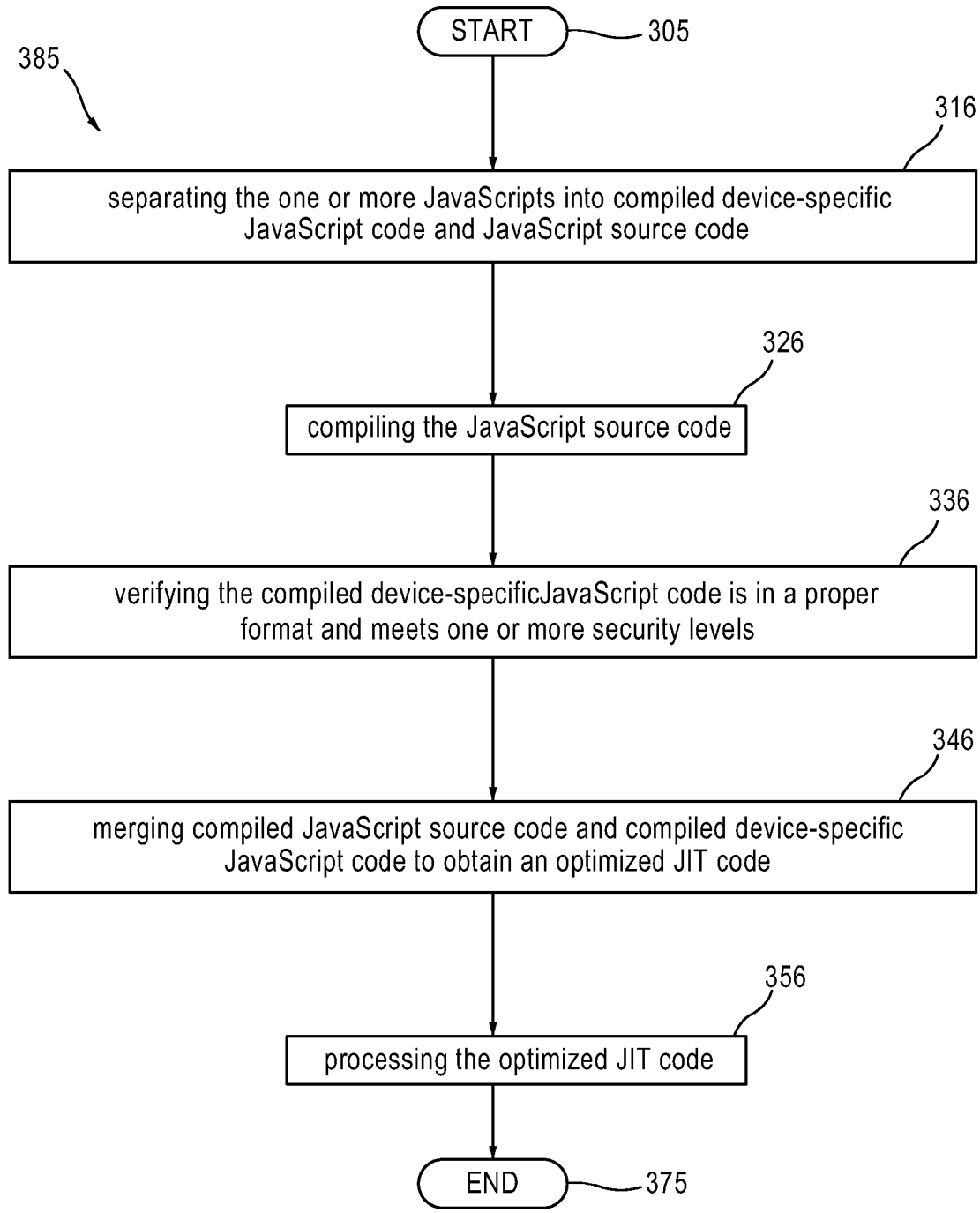
FIG. 3 illustrates a flowchart that depicts a method that may be carried out in connection with the embodiments described herein.
Figure 4:
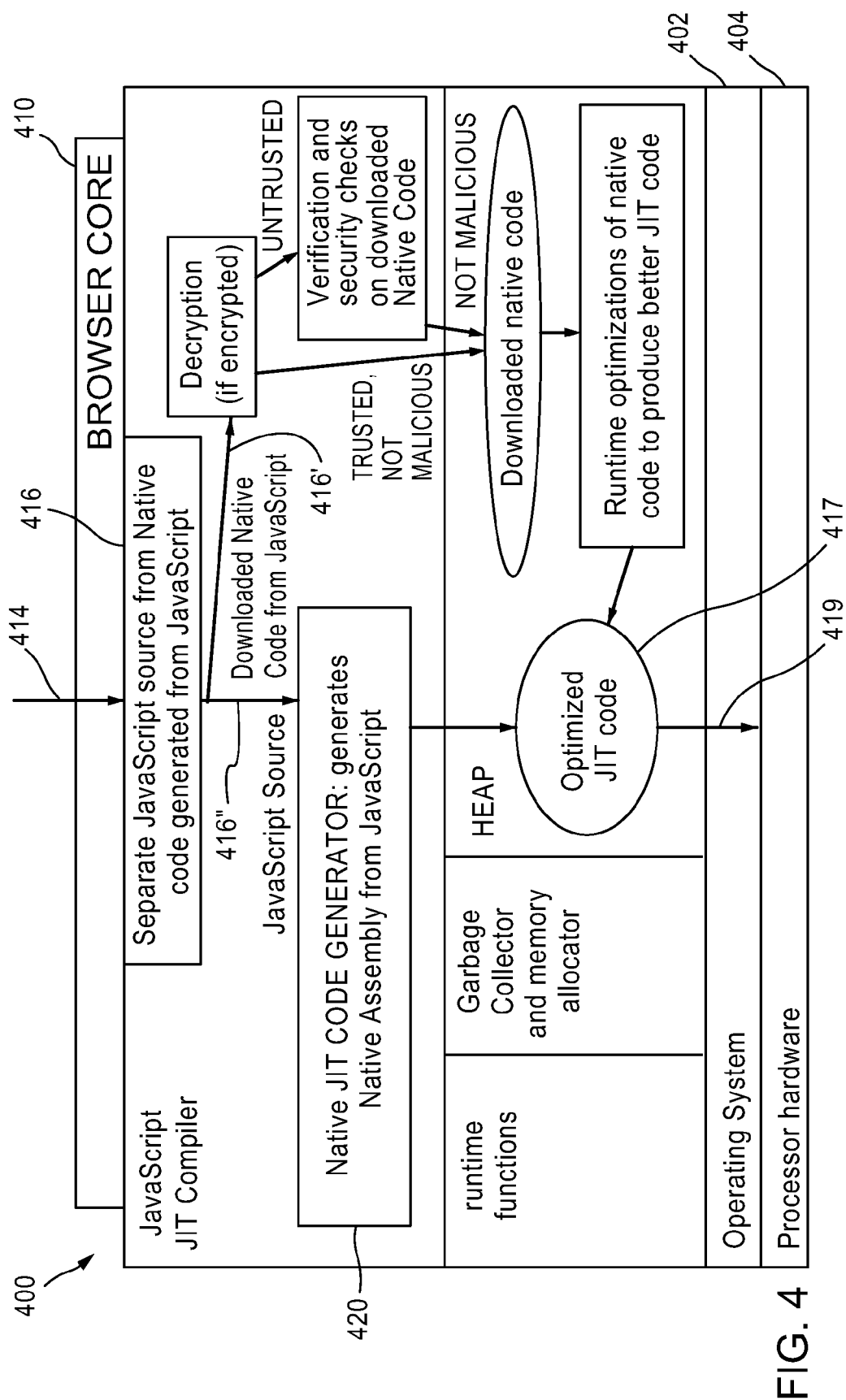
FIG. 4 illustrates a representation of a computing device.

Another embodiment of the invention comprises a non-transitory, tangible computer readable storage medium, encoded with processor readable instructions to perform a method of processing one or more JavaScripts. For example, seen in FIG. 3 is one method 385 that may be performed by the storage medium. One method 385 starts at 305 and at 316 comprises separating pre—the one or more JavaScripts such as, but not limited to, the JavaScript 162 seen in FIG. 1 into compiled device-specific JavaScript 162 code and JavaScript 162 source code. Seen in FIG. 4 is a representation of a computing device 400 comprising an application 410 comprising a web browser having a browser core, an operating system 402 and processor hardware 404. The application 410 may receive a response 414 similar to the response 114 seen in FIG. 1 comprising the one or more JavaScripts 162 and at 416 separates the pre-compiled device-specific JavaScript code 416' (i.e. native code) from JavaScript source code 416" in the one or more JavaScripts 162.

Turning back to FIG. 3, at 326 the method 385 comprises compiling the JavaScript source code separated from the received JavaScript 162, while at step 336 the method 385 comprises verifying the pre-compiled device-specific code is in a proper format and meets one or more security levels. Step 336 may be performed by a script(s) or otherwise at the computing device 400. For example, FIG. 4 shows that the JavaScript source code 416" is sent to, and compiled by, a JavaScript Compiler 420 comprising a JIT code generator. Verification that the device-specific code 416' comprises code pre-compiled at a network device 150 in a proper format is performed and various security checks may be completed. At 346 the method 385 comprises merging the compiled JavaScript source code and pre-compiled device-specific code to obtain an optimized JIT code 417 and at 356 the method 385 comprises processing 419 the optimized JIT code.

Verifying that the pre-compiled device-specific code 416' is in a proper format and meets one or more security levels may be conducted by the JavaScript Engine. For example, a verifier may check if there are any branch instructions taking the control flow outside the address—space of the precompiled native code, among various other checks. Along these lines, the verification process may determine whether access by the precompiled native code 416' to known APIs that are implemented in the client device is allowed. For example, the verification process may determine whether to allow the pre-compiled native code 416' to access different Device APIs and Browser API, since these calls to the API could also appear as jumping out of the executable address space. Mechanisms such as, but not limited to, registration of known jump-out address/symbols may be used so that the verification module determines that the device-specific code 416' is safe when API access appear as native object code 416'.

The one or more JavaScripts 162 may identify one or more portions of the JavaScript 162 as a trusted or an untrusted portion of the JavaScript 162. Each of the trusted and untrusted portions may be fully or partly pre-compiled into native code 416' or may be maintained as JavaScript source 416" by the host-side toolchain. When precompiled native code 416' originates from a trusted portion of the JavaScript 162, the verification step in the JavaScript Engine in the client device 400 may be bypassed by employing encryption at the host side toolchain on the pre-compiled native code 416' and decryption of the encrypted precompiled native code 416' within the JavaScript Engine in the client side device 400. Determining whether to verify such code or to use this type of encryption/decryption may depend on which process will incur the least amount of processing overhead. For example, encryption/description may be implemented if it is determined that decryption will incur less processing overhead than verifying the trusted code. However, verification should not be bypassed when the precompiled native code originates from one or more untrusted portions of the JavaScript 162. For example, the logic in the host-side tool chain may determine that third party libraries are untrusted even if the WebApp code, written originally by the WebApp developer, can be trusted. The host side toolchain may consider to (i) NOT native compile the third party libraries but just (a) provide it as source or (b) keep portions of the WebApp that includes the 3rd party library as resource in JavaScript source form without native compiling, or (ii) if the untrusted third party libraries are converted to native code 416' the Verifier within the JavaScript Engine must verify the native code 416'. The JavaScript code 162 that is originally written by the web App developer and if it is considered trusted can be native compiled and encrypted, and just decrypted and verification bypassed in the client side device 400. If native precompiled code that originated from untrusted JavaScript code is also encrypted, it also needs to be verified in the JS engine in the client device 400 after decryption.

Figure 5:
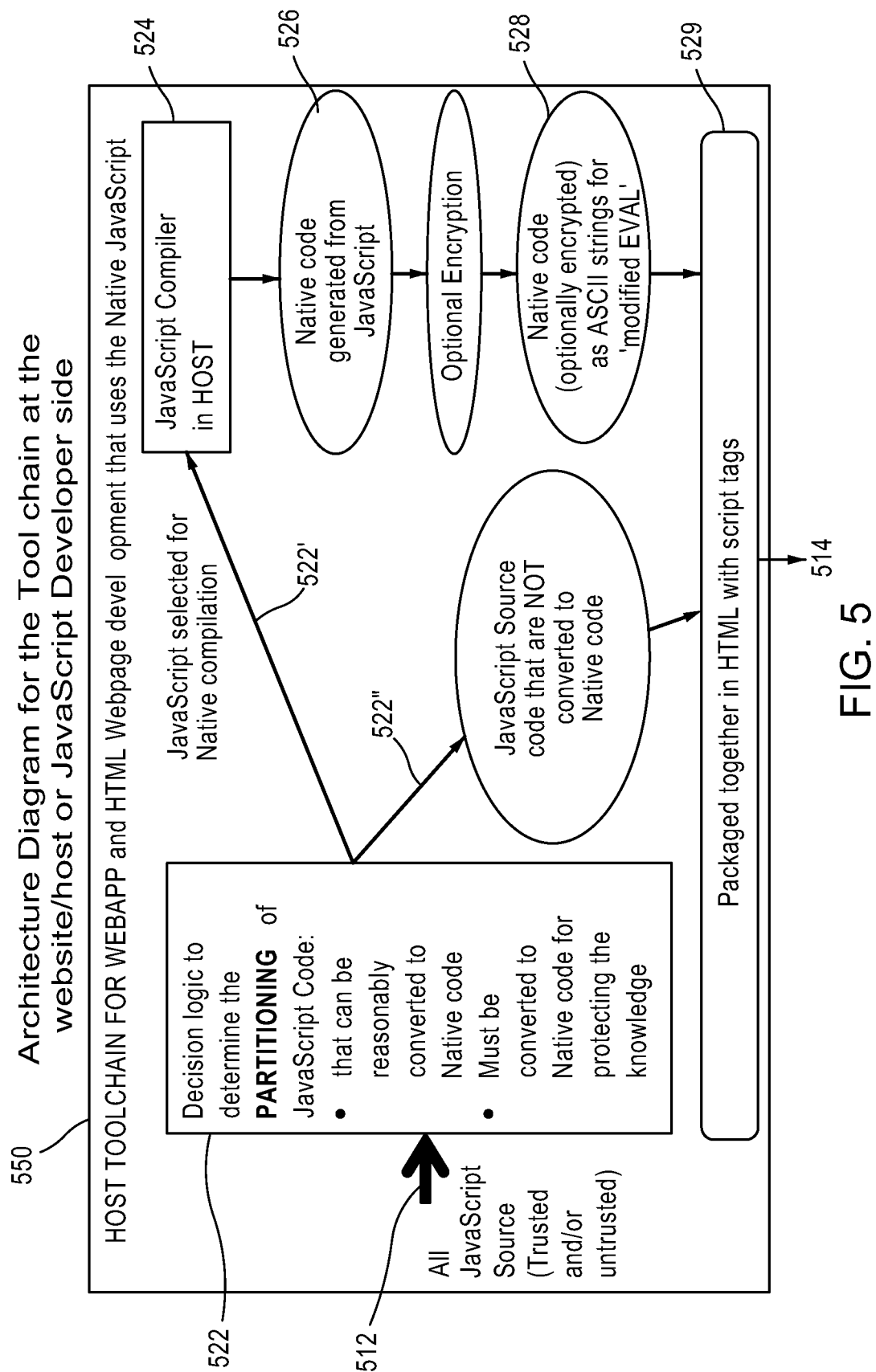
FIG. 5 illustrates a block diagram of at least one of a network device operation, hostside device operation, or toolchain operation.

Seen in FIG. 5 is one embodiment of a network device 550 operation hostside device operation, or toolchain operation, wherein the toolchain operation may be used by a web-page/ web-application developer before hosting the application in a website (or as a webapp). In one embodiment, the network device 550 may receive the response 512 comprising a request for one or more JavaScripts. Upon receiving the request 512, the network device 550 may partition 522 the one or more JavaScripts into (i) JavaScript selected 522' to be developed into native code and (ii) JavaScript to remain 522" as source code. The network device 520 may then implement a network device JavaScript Compiler adapted to create the native code and develop 528 the native code as ASCII strings for a modified EVAL function. The JavaScript to remain 522" as source code is then packaged 529 with the ASCII string in, for example, an HTML document and sent to the computing device 100 as a response 512.

In conclusion, embodiments of the present invention provides a secure distribution mechanism for JavaScript code whereby certain parts of the application JavaScript code is sent precompiled avoiding exposing the JavaScript source code. The present invention can also increase application performance on a computing device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computing device comprising:
A processor and a memory,
wherein the processor is configured to:
request to receive at least one JavaScript, the request comprising a computing device processor type and one or more computing device features, and receive the at least one JavaScript from a network device, the at least one JavaScript being partitioned into a plurality of sections, the plurality of sections comprising,
one or more pre-compiled first sections of the at least one JavaScript, the processor type and one or more computing device features being used in pre-compiling the one or more first sections of the at least one JavaScript, and
one or more second sections of the at least one JavaScript comprising JavaScript source code;
compile the one or more second sections of the at least one JavaScript;
execute the one or more first sections of the at least one JavaScript and the one or more second sections of the at least one JavaScript;
wherein the JavaScript is partitioned into the one or more first sections and the one or more second sections based on achieving one or more of:
protection of unique code features,
performance benefits of executing the at least one JavaScript,
one or more security levels,
and an ease of conversion;
wherein, the one or more first sections of the JavaScript comprise a trusted portion and an untrusted portion;
and executing the one or more first sections of the JavaScript comprises, determining the amount of processing overhead for each of,
verifying the trusted portion of the one or more first sections of the JavaScript, and
decrypting the trusted portion of the one or more first sections of the JavaScript,
and implementing one of the verifying and the decrypting of the trusted portion of the one or more first sections of the JavaScript based on the amount of processing overhead.

2. The computing device of claim 1 wherein, the network device comprises a host toolchain; and
receives and processes a user-agent string;
compiles the one or more first sections of the at least one JavaScript into the one or more pre-compiled first sections of the JavaScript, the one or more pre-compiled first sections of the JavaScript comprising a unique native code, wherein the unique native code is derived from the JavaScript code;
packages the unique native code and the one or more second sections of the JavaScript source code; and sends the unique native code and the one or more second sections of the JavaScript source code to the computing device.

3. The computing device of claim 2, wherein the processor is further configured to:
encrypt at least a section of the trusted portion of the at least one JavaScript;
skip a verification step, and decrypt the at least a section of the trusted portion of the at least one JavaScript.

4. The computing device of claim 2 wherein,
the host toolchain packages the unique native code comprises packaging the unique native code as an ASCII string with at least one of,
a JavaScript wrapper, and
a header; and
wherein the processor is further configured to implement an EVAL function to separate the unique native code and the one or more second sections of the JavaScript source code.

5. The computing device of claim 1 wherein, the application comprises a web browser.

6. The computing device of claim 1 wherein,
the request to receive at least one JavaScript comprises a request to receive a web page; and wherein
the web page comprises an HTML page, a CSS object, one or more images, and the compiled one or more pre-compiled first sections of the at least one JavaScript,
and wherein the processor is further configured to:
send the one or more second sections of the at least one JavaScript to a JavaScript compiler, and
send the one or more pre-compiled first sections of the at least one JavaScript to a JavaScript Engine.

7. The computing device of claim 6 wherein, the JavaScript Engine comprises software fault-isolation techniques; the one or more pre-compiled first sections of the at least one JavaScript comprises a unique native code, wherein the unique native code is derived from the JavaScript code; and the software fault-isolation techniques are adapted to be applied on the unique native code.

8. A method of processing a JavaScript comprising,
sending a request for the JavaScript from a computing device to a hosting device, wherein the request comprises a computing device processor type and one or more computing device architectural features;
using the processor type, the one or more computing device architectural features, and the requested JavaScript at the hosting device to, partition the JavaScript into one or more first sections of the JavaScript and one or more second sections of the JavaScript based on achieving one or more of:

protection of unique code features,
performance benefits of executing the at least one JavaScript,
one or more security levels,
and an ease of conversion;
and compile the one or more first sections of the JavaScript into pre-compiled native code;
attaching header information to the one or more first sections of the JavaScript, the header information identifying the one or more first sections of the JavaScript as pre-compiled native code;
sending the JavaScript to the computing device from the hosting device, the JavaScript comprising,
the one or more first sections of the JavaScript, and the one or more second sections of the JavaScript, the one or more second sections of the JavaScript comprising any remaining sections of the JavaScript not partitioned and compiled as the one or more first sections of the JavaScript;
compiling the one or more second sections of the JavaScript at the computing device;
and executing the one or more first sections of the JavaScript and the one or more second sections of the JavaScript at the computing device;
wherein, the one or more first sections of the JavaScript comprise a trusted portion and an untrusted portion;
and executing the one or more first sections of the JavaScript comprises, determining the amount of processing overhead for each of, verifying the trusted portion of the one or more first sections of the JavaScript, and decrypting the trusted portion of the one or more first sections of the JavaScript,
and implementing one of the verifying and the decrypting of the trusted portion of the one or more first sections of the JavaScript based on the amount of processing overhead.

9. The method of claim 8 wherein, the request comprises a first HTTP GET request;
and the one or more second sections of the JavaScript comprise JavaScript source code.

10. The method of claim 8 wherein, using the CPU type, one or more computing device architectural features, and the requested JavaScript at the hosting device to partition the JavaScript into one or more first sections of the JavaScript and one or more second sections of the JavaScript and compile the one or more first sections of the JavaScript comprises,
pre-partitioning and pre-compiling the JavaScript into one or more first sections of the JavaScript for at least one of one or more CPU types and one or more architectural features.

11. The method of claim 10 wherein, the one or more CPU types comprise at least one of an ARM CPU, an IA32 CPU, and an x86-64 CPU.

12. The method of claim 10 wherein, using the processor type, one or more computing device architectural features, and the requested JavaScript at the hosting device to partition the JavaScript into one or more first sections of the JavaScript for at least one of one or more processor types and one or more second sections of the JavaScript and compile the one or more processor types comprise at least one of an ARM processor, an IA32 processor, and an x86-64 processor type, one or more computing device architectural features, and the requested JavaScript at the hosting device in partitioning and compiling one or more first sections of the JavaScript comprises determining the one or more first sections of the JavaScript by implementing decision logic.

13. The method of claim 12 wherein, determining the one or more first sections of the JavaScript by implementing decision logic comprises, determining one or more first sections of the JavaScript that are executed at the computing device by a JavaScript Engine without decreasing performance and increasing security risk.

14. The method of claim 8 wherein, the header information comprises at least one of,
security handshake information;
checksum validation information;
information adapted to enable the one or more first sections of the JavaScript to be executed similar to the one or more second sections of the JavaScript when an error is encountered during execution of the one or more first sections of the JavaScript;
permission and authentication fields;
size fields;
and at least one of a compression algorithm and compression format field.

* * * * *